United States Patent [19]

Campbell, Jr.

[11] 4,314,097
[45] Feb. 2, 1982

[54] AUTHENTICATOR DEVICE FOR PRECLUDING COMPENSATING TEXT MODIFICATIONS IN TRANSMITTED MESSAGES

[75] Inventor: Carl M. Campbell, Jr., Newtown Square, Pa.

[73] Assignee: Burroughs Corporation, Detroit, Mich.

[21] Appl. No.: 128,667

[22] Filed: Mar. 10, 1980

[51] Int. Cl.³ .................................................. H04L 9/00
[52] U.S. Cl. ............................. 178/22.08; 340/825.3; 235/380
[58] Field of Search .................... 178/22, 22.08; 375/2; 340/149 A, 149 R; 235/379, 380, 382; 364/200

[56] References Cited

U.S. PATENT DOCUMENTS

| | | | |
|---|---|---|---|
| 4,025,760 | 5/1977 | Trenkamp | 178/22 |
| 4,168,396 | 9/1979 | Best | 178/22 |
| 4,172,213 | 10/1979 | Barnes et al. | 178/22 |
| 4,193,131 | 3/1980 | Lennon et al. | 340/149 R |
| 4,218,738 | 8/1980 | Matyas | 178/22.08 |
| 4,238,854 | 12/1980 | Ehrsom et al. | 375/2 |

*Primary Examiner*—Howard A. Birmiel
*Attorney, Agent, or Firm*—Mark T. Starr

[57] ABSTRACT

An authenticator device designed to preclude undetected compensating text modifications in a message by sequentially processing each character of the message and producing an authenticator code as a result of said processing.

As each message is received, it is modulo added to the contents of a first register and the result is used to simultaneously address first and second memories, the values stored in the first memory consisting of a specified permutation of preselected decimal values, the values stored in the second memory consisting of non-linear transformations of a 16 digit authentication key. The data read out of the second memory is used to address a third memory, the values stored in the third memory consisting of another specified permutation of preselected decimal values. The data read out of the third memory replaces the value previously stored in the first register. The data read out of the first memory is modulo added into a shift register, which after the addition is circularly shifted a fixed number of bit positions. The same processing is repeated for each character of the message text, after which the residue remaining in the shift register is available for use as the authenticator code.

11 Claims, 2 Drawing Figures

AUTHENTICATOR DEVICE FOR PRECLUDING COMPENSATING TEXT MODIFICATIONS IN TRANSMITTED MESSAGES

BACKGROUND OF THE INVENTION

The present application relates in general to the art of cryptography and more specifically to hardware and techniques for achieving data communications security.

As the electronic transfer of information becomes more and more common, the need to safeguard this information becomes increasingly important. Many large corporations have data-communications systems over which they transmit, or would like to transmit, information of a sensitive nature, whose disclosure could be very detrimental to the corporation. In addition, the Federal Government is becoming increasingly concerned about insuring the individual's right of privacy. For this reason, the Government is already planning security provisions for its own widespread non-military communications networks. Government regulations of the future may impose similar security requirements upon the many types of non-governmental communications.

Perhaps most important of all is the evolution towards the "cashless society" in which transmitted data represents money. Even today many savings banks send monetary transactions through electronic data communications networks and are thus vulnerable to "electronic counterfeiting". Although it has apparently not yet occurred, a highly sophisticated "counterfeiter", with the ability to both monitor and insert data into the communications link, could manipulate such transactions to his advantage.

From the preceding discussion it is apparent that there are two aspects to communications security: confidentiality assurance and integrity assurance. Confidentiality assurance protects the transmitted data against comprehension by anyone who should tap the communications line. In other words, it provides "read" protection. Integrity assurance, on the other hand, protects the transmitted data against being intercepted, modified, and then retransmitted in such a way that the final recipient of the message will receive an intelligible and apparently valid message but one which has in fact been modified. In other words, this aspect of security provides "write" protection.

Properly designed cryptographic equipment can provide for both of these aspects of security. Encryption by its very nature transforms data into an unintelligible form; hence, all well-designed cryptographic equipment provides confidentiality assurance. Although many encryption techniques do not assure integrity, there are cryptographic techniques known which assure both confidentiality and integrity. Typical of such techniques is that disclosed in U.S. Pat. No. 4,159,463, entitled "Communications Line Authentication Device", which is assigned to the same assignee as the present application. Such encryption techniques have the characteristic that any change to any character of the cipher (encrypted traffic) causes subsequent characters of the plain-text (decrypted message) to become garbled (rendered unintelligible). This characteristic is called "garble extension". Therefore, it is possible to develop cryptographic equipment which provides for both of these aspects of security by basing this equipment on an encryption technique which is highly secure and which has the "garble extension" property.

In the prior art, many banks utilized test keys to aid security on telex transfers. In such a case, a bank issues test key procedures to their correspondents with one or more components of those procedures being unique to each correspondent. Components of the message are used in various arithmetical calculations, often including table look-up functions. The numeric result of the calculations is added to the message as a test key. The receiver checks the test key by performing the same calculations and using the same components of the message.

An advance over the prior art came in the form of an authenticator device which is somewhat similar to such a test key calculation but offers a level of security many, many times higher. In an authenticator device, the entire message text is used in the calculations and the calculations are based on an algorithm of great complexity. The same algorithm is used by all communicating banks. However, the algorithm also requires an authenticator key for its calculations. An authenticator key will be agreed upon between two correspondent banks and will not be known to any other party. This unique authenticator key ensures that the result of the algorithm can only be generated and/or checked by the sending and receiving banks.

The result of the algorithm is added to the trailer of the message. The receiving bank is able to check the authenticator result by using the common algorithm and the unique authenticator key agreed to with the sending bank.

In a typical modern communications system where it is desired to verify the integrity of transmitted messages, authenticator devices are normally inserted at both transmitting and receiving ends of the communications line. At the transmitter end, the authenticator device receives a plain text message from the communications line, generates an authenticator code by encrypting the plain text message received and retransmits the plain text message received, with the authenticator code appended thereto, onto the communications line.

At the receiver end, the authenticator device receives the message from the communications line, generates an authenticator code by encrypting the plain text portion of the message received and compares the authenticator code generated with the authenticator code appended to the plain text portion of the message received. If the two authenticator codes are identical, the plain text message has been received exactly as it was transmitted. If the two authentication fields differ, either an error occurred during transmission of the message or the message has been altered during transmission; viz, the integrity of the message is in doubt.

Many prior art authenticator code generators for which the key is virtually impossible to determine can be circumvented by making compensating text modifications. In such case, the would-be conterfeiter can make a simple change in the text (perhaps to the leading digit of an amount field), and then, from a knowledge of the device's operation but not the key, determine another change which has a reasonable probability of compensating for the first change so that the original authenticator code is still valid. It is an object of the present invention to provide an authentication code generator which processes every character in a message and produces a 16 bit authenticator code which provides a very high degree of security against the threat of compensating text modifications, viz, a fraudulent change in the message text associated with another change which has a reasonable probability of compensating for the first change in such a way that the authenticator code of the original message would be valid for the modified message.

It is another object of the present invention to be immune to this threat by providing a generator wherein any text modification or combination has only one chance in 65,536 of having the original authenticator code still valid.

It is a further object of this invention to provide an improved authenticator code generator for generating a unique authenticator code which is dependent on a key stored in the authenticator code generator and the text of a received message.

Further, it is an object of this invention to provide an authenticator code generation device which precludes the undetected introduction of compensating type changes in a message.

These and other objects, features and advantages of the present invention will become apparent from the description of the preferred embodiment of the invention when read in conjunction with the drawings contained herewith.

SUMMARY OF THE INVENTION

This is an authenticator code generation device for encrypting the contents of a plain text message in accordance with a 16 digit authenticator key and producing a residue which is utilized as the authenticator code.

The device sequentially processes each 6-bit character of the message text within its internal registers and produces a first 16 bit authenticator code. As each character is received, it is modulo-2 combined with the contents of a first register and the result is used to simultaneously address first and second memories, the values stored in the first memory consisting of a specified permutation of the values 0–63, the values stored in the second memory consisting of non-linear transformations of the 16 digit authentication key. The data read out of the second memory is used to address a third memory, the values stored in the third memory consisting of another specified permutation of the values 0–63. The data read out of the third memory replaces the value previously stored in the first register. The data read out of the first memory is exclusive-OR'ed into the 6 low order bit positions of a 16 bit shift register. The shift register is then shifted circular, right, 5 bit positions. The same processing is repeated for each character of the message, after which the 16 bit residue remaining in the shift register is available for use as the authenticator code.

DESCRIPTION OF THE PREFERRED EMBODIMENT

Figure 1:
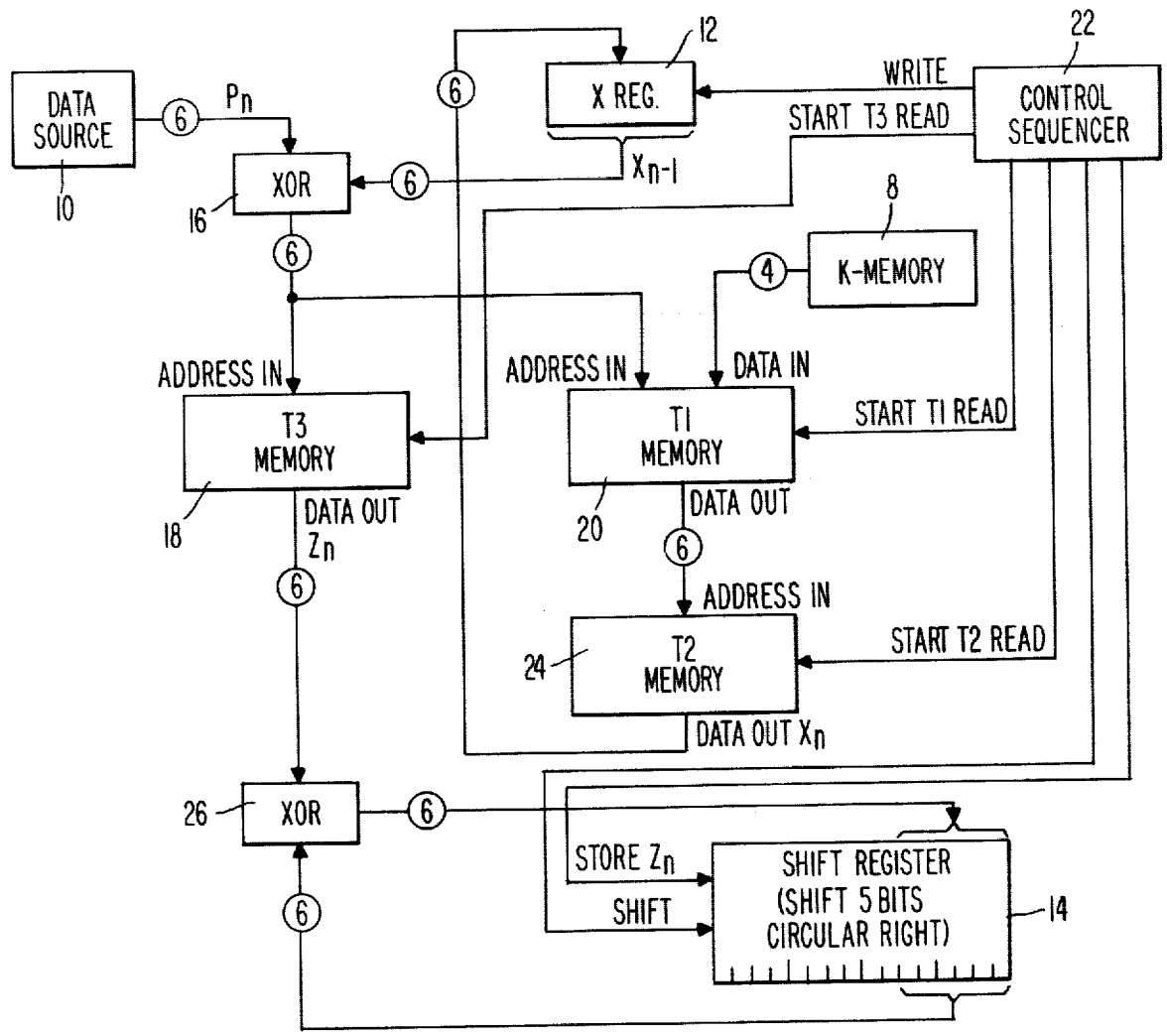
FIG. 1 is a schematic block diagram of the authenticator device.
Figure 2:
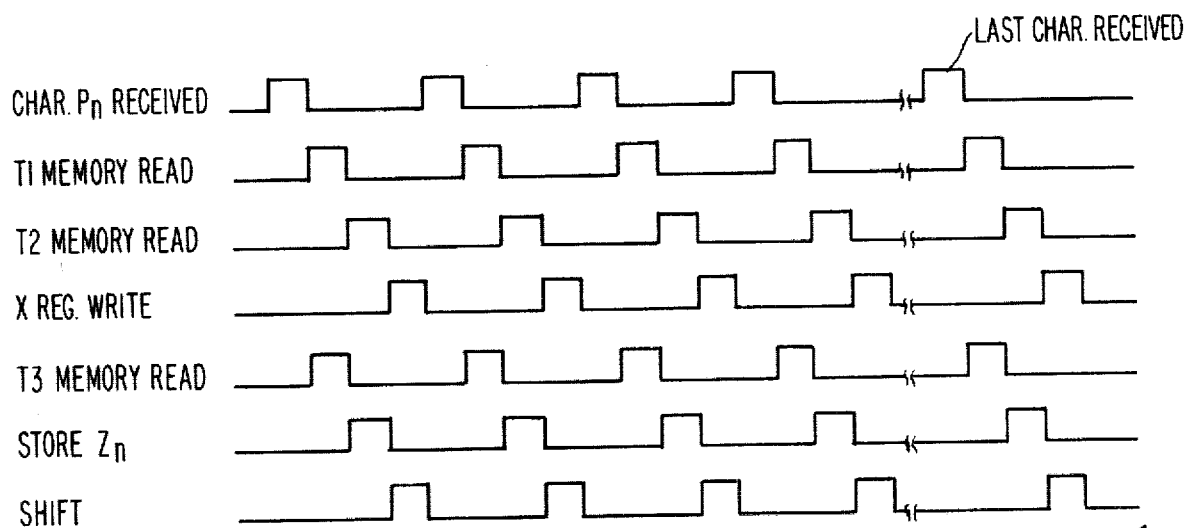
FIG. 2 is a timing diagram showing the control signals generated by the control sequence used in the authenticator device.

The authentication system shown in FIG. 1 processes an n character message in accordance with the the timing control diagram of FIG. 2.

For the purposes of facilitating the understanding of the invention, the following terms and elements are defined as follows:

K, T1, T2, and T3 are tables, implemented in the form of memories, the tables' contents defined as follows:

In the preferred embodiment, the K memory 8 functions as a 16 entry table, 4 bits per entry, consisting of a permutation of the hexadecimal digits 0–F. The K memory 8 is used to store the 16 digit, 4 bits per digit, authenticator key and is thus a secret table. Those skilled in the art will realize that the K-memory 8 may be loaded with the secret, user chosen, 16-digit authenticator key by means such as a plug in ROM. Further, it will be realized that the authenticator key loaded may itself be generated by a separate encryption device, such as that disclosed in pending U.S. patent application Ser. No. 078,913, entitled "Key Variable Generator for an Encryption/Decryption Device", filed Sept. 26, 1979 by the same inventor as the present application and assigned to the same assignee as the present application.

The T1 memory 30 functions as a 64 entry table with six bits per entry, with the following values:

| | |
|---|---|
| T1(1) = 00 K(1) | Note that T(i) is the "ith" |
| T1(2) = 01 K(1) | entry in a table, and K(i) |
| T1(3) = 10 K(1) | is the "ith" digit of the |
| T1(4) = 11 K(1) | 16-digit authenticator key. |
| T1(5) = 00 K(2) | |
| . | |
| . | |
| T1(64) = 11 K(16) | |

The T2 memory 24 functions as a 64 entry table, 6 bits per entry, consisting of a specified permutation (chosen by the user) of the values 0 through 63. This table is not secret.

The T3 memory 18 functions as another 64 entry table, 6 bits per entry, consisting of another specified permutation (chosen by the user) of the values 0 through 63. This table is not secret.

$P_n$ is the "nth" plain text character of the message to be included in the authenticator code generation. In the preferred embodiment, it is a 6 bit character.

Referring now to FIG. 1, prior to receiving any of a message's plain text characters $P_n$ from the data source 10, the contents of X-Register 12 and shift register 14 are initialized to zero. At the same time, the T1 memory 20 is loaded with the 16 digit authenticator key contained in the K memory 8 (by means not shown) and thus initialized to the values given in the definitions. As each plain text character $P_n$ of the message is received from data source 10, it is combined with the contents of X-register 12 modulo-two fashion in a device such as exclusive-OR gate 16. The product formed at the output of exclusive-OR gate 16 provides the address input to both the T1 memory 20 and the T3-memory 18. Referring now to the timing diagram of FIG. 2 and noting that the timing diagram neglects signal propagation and memory address time delays, with the output of exclusive-OR gate 16 providing an address at the inputs of both memories 18 and 20, a read cycle is initiated at each of these memories under control of the control sequencer 22.

The design of the required control sequencer 22 will be obvious to those skilled in the art from the discussion to follow and particularly by making reference to FIG. 2, which shows the timing signals generated by the control sequencer 22. The control sequencer 22 controls the sequencing of the various elements included in the preferred embodiment of the invention. Among the possibilities for implementing the control sequencer 22 is the use of a microprocessor.

The data read out of the T1-memory 20 serves as the address input to the T2-memory 24. With the data output of the T1-memory 20 available as the address input to the T2-memory 24, the control sequencer 22 initiates a read cycle to the T2-memory 24. The data read out of T2-memory 24 is then stored in X-register 12 under control of the WRITE signal from control sequencer 22.

The data read out of T3-memory 18 is combined with the six low order bits from shift register 14 in exclusive-OR gate 26 and the resulting product produced at the output of exclusive-OR gate 16 is used to replace the previous six low order bit positions of shift register 14 under control of the STORE $Z_n$ signal from control sequencer 22. Next, the contents of shift register 14 are shifted circular, right, 5 bit positions in response to the SHIFT signal from control sequencer 22.

At this point, the processing of one message character $P_n$ has been completed. As shown in FIG. 2, the same process is repeated as each message character $P_n$ is provided by data source 10, the only exception being that neither X-register 12 or shift register 14 is cleared as long as the same message is being processed. After the last character $P_n$ in the n-character message has been processed, the 16 bit authenticator key produced by the present authenticator device is available in shift register 14.

While the invention has been particularly shown and described with reference to the preferred embodiment thereof, those skilled in the art will realize that various omissions, substitutions and changes in forms and details of the present invention may be made without departing from the spirit and scope of the invention.

It should also be recognized by those skilled in the art that, while the specific embodiment disclosed herein for carrying out the authenticator code generation is a hardware structure, the concepts presented are capable of being implemented by program means executable on either a special purpose or a general purpose computer. The selection of hardware or software means is a trade-off decision dependent on cost-performance factors. It is the intention, therefore, to be limited only as indicated by the scope of the following claims.

What is claimed is:

1. A cryptographic system for enciphering a message comprised of n plain text characters under control of an authenticator key comprised of k digits and producing an authenticator code, said authenticator code for insertion at a predetermined point within said message as a means of preventing undetected compensating changes to the message text, said system comprising:
   transform means, responsive to each character of said n character message, said transform means for transforming each of said n characters as a function of said authenticator key, whereby a transformed character Zn is generated for each of said n characters of said message, said transform means including
   first combining means for combining each of said n characters with the contents of a writable storage unit,
   addressable storage means (T3) connected to said first combining means, said addressable storage means (T3) for storing said transformed characters Zn, and
   feedback means, connected to said first combining means, said feedback means for storing a new value in said writable storage unit after each of said n characters is combined with the contents of said writable storage unit;
   means for storing said authenticator code; and
   means connected to said transform means and said authenticator code storage means, said means for combining each of said transformed characters Zn with information contained in said authenticator code storage means and substituting the combined result back into said authenticator code storage means.

2. The cryptographic system in accordance with claim 1 wherein said feedback means includes:
   addressable storage means (T1), connected to said first combining means, said addressable storage means (T1) for storing a first set of entries which are a function of said k-digit authenticator key;
   addressable storage means (T2), connected to said addressable storage means (T1), said addressable storage means (T2) for storing a second set of entries; and
   transfer means, connected between said addressable storage means (T2) and said writable storage unit, said transfer means for storing the entries read from said addressable storage means (T2) in said writable storage unit.

3. The cryptographic system in accordance with claim 1 wherein said transformed character combining means further includes means, responsive to the substitution of said combined results back into said authenticator code storage means, said means for circularly shifting the contents of said authenticator code storage means.

4. The cryptographic system in accordance with claim 2 wherein said transformed character combining means further includes means, responsive to the substitution of said combined results back into said authenticator code storage means, said means for circularly shifting the contents of said authenticator code storage means.

5. The cryptographic system in accordance with claim 2 wherein said feedback means further includes key storage means, connected to said addressable storage means (T1), said key storage means for storing said k-digit authenticator key.

6. The cryptographic system in accordance with claim 3 or 4 wherein said authenticator code storage means includes a shift register, the input to said shift register connected to an output of said transformed character combining means, the output of said shift register providing an input to said transformed character combining means.

7. The cryptographic system in accordance with claim 6 wherein said transformed character combining means includes an exclusive-OR gate for performing a modulo-2 addition of the data output of said addressable storage means (T3) and information contained in said shift register.

8. The cryptographic system in accordance with claim 1 wherein said first combining means includes an exclusive-OR gate for performing a modulo-2 addition of each of said n plain text characters and information contained in said writable storage unit.

9. The cryptographic system in accordance with claim 6 wherein said first combining means includes an exclusive-OR gate for performing a modulo-2 addition of each of said n plain text characters and information contained in said writable storage unit.

10. The cryptographic system in accordance with claim 2 wherein:
   said T3 addressable storage means is further characterized as receiving its address input from said first combining means; and
   said feedback means is further characterized as receiving its input from the output of said first combining means.

11. The cryptographic system in accordance with claim 10 wherein:
   said T1 addressable storage means is further characterized as receiving its address input from the output of said first combining means; and
   said T2 addressable storage means is further characterized as receiving its address input from the output of said T1 addressable storage means.

* * * * *